June 12, 1923.

O. H. MENNING

VEHICLE BODY

Filed Oct. 3, 1921  4 Sheets-Sheet 1

1,458,352

Inventor
Otto H. Menning
By Hardway Cathy
Attorneys

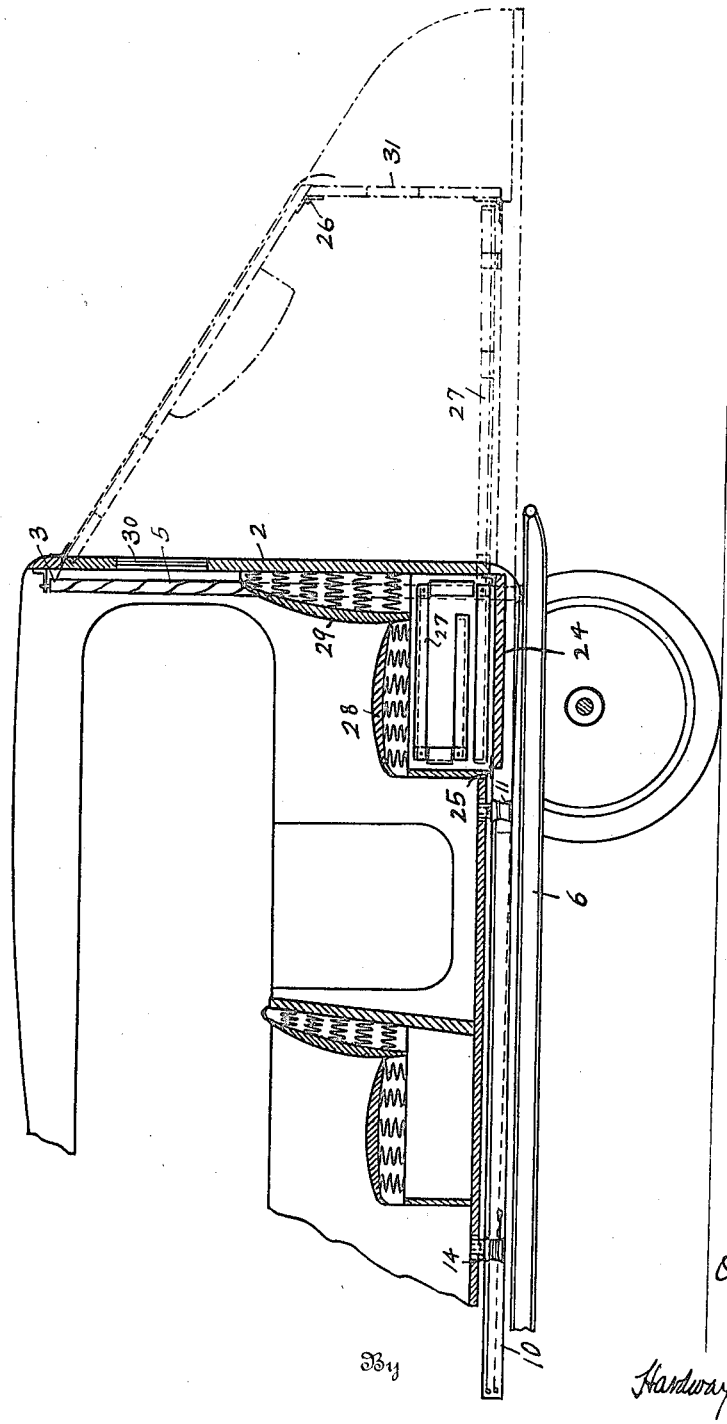

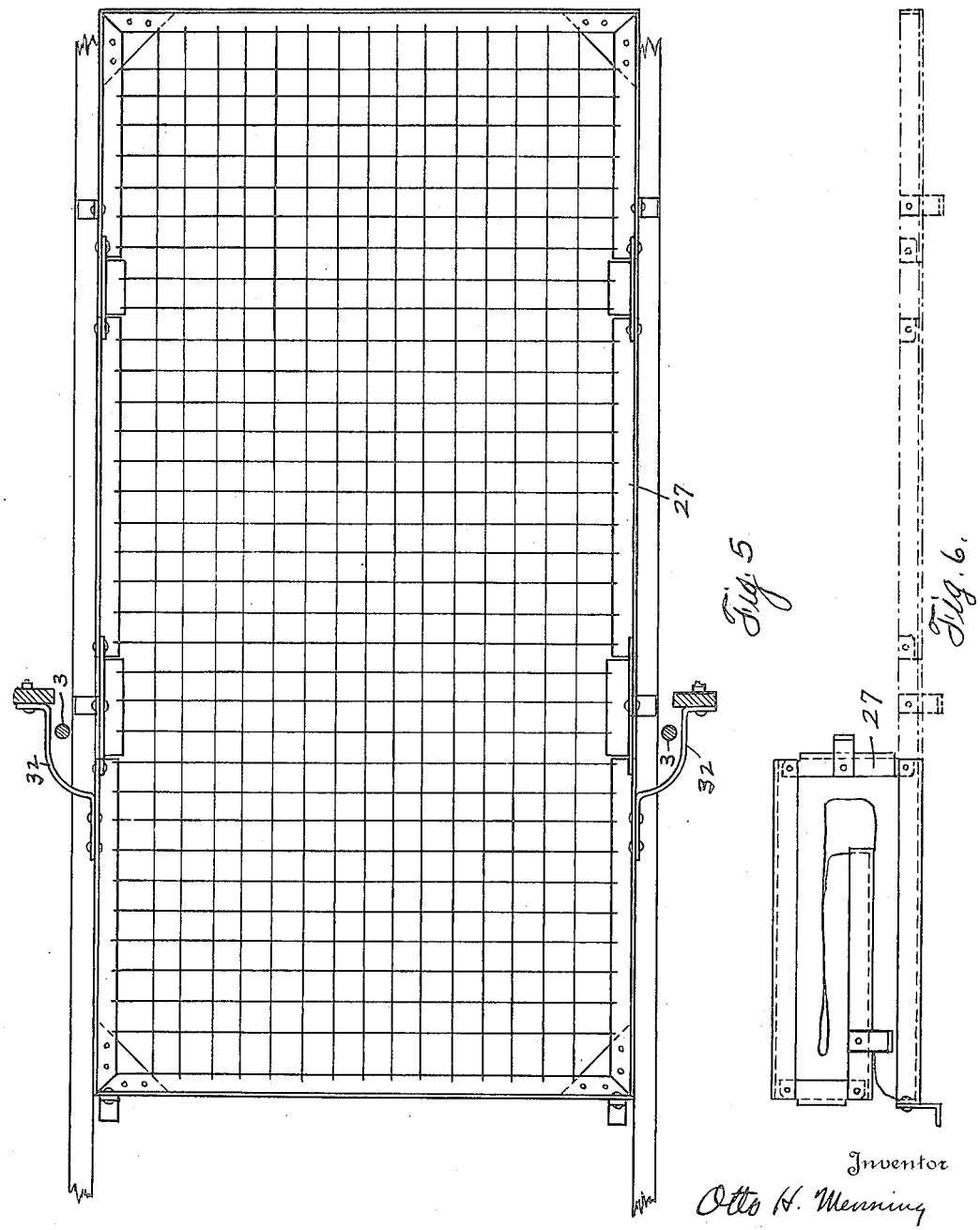

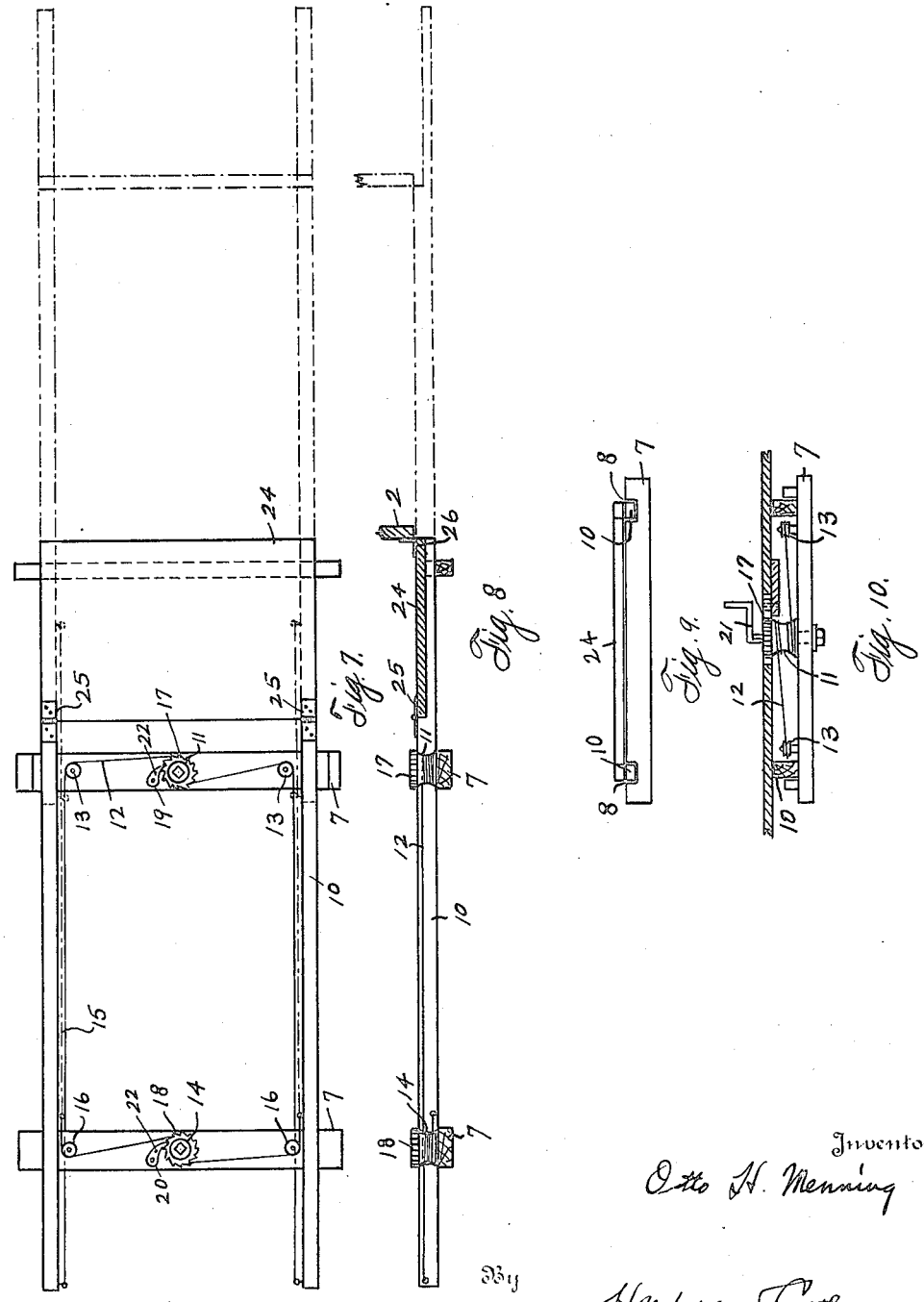

Patented June 12, 1923.

1,458,352

UNITED STATES PATENT OFFICE.

OTTO H. MENNING, OF HOUSTON, TEXAS.

VEHICLE BODY.

Application filed October 3, 1921. Serial No. 504,848.

*To all whom it may concern:*

Be it known that I, OTTO H. MENNING, a citizen of the United States, residing at Houston, in the county of Harris and State of Texas, have invented certain new and useful Improvements in a Vehicle Body, of which the following is a specification.

This invention relates to new and useful improvements in a vehicle body.

One object of the invention is to provide a vehicle body, specially adapted for use on motor vehicles and equipped with an extension frame carried underneath the body which may be projected out behind the vehicle, when in use, and which is provided to support a mattress, thus forming a bed for the accommodation of passengers.

Another object of the invention resides in the provision of a foldable mattress frame and mattress carried thereon which is arranged to be carried under the seat of the vehicle.

A further feature resides in the provision of a suitable covering and side curtains for the protection of those occupying the bed, said covering forming the rear end of the body, and said side curtains being compactly stored within the body out of view, when the bed is not in use.

A still further feature of the invention resides in means for easily extending the frame, side curtains and covering, when it is desired to use the bed and for withdrawing said parts when not in use.

With the above and other objects in view the invention has particular relation to certain novel features of construction, operation, and arrangement of parts, an example of which is given in this specification and illustrated in the accompanying drawings, wherein:—

Figure 4 shows a longitudinal vertical sectional view of the rear end of said vehicle with the parts shown in folded up position, and also shown in extended position in dotted lines.

Figure 5 shows a plan view of the mattress frame.

Figure 6 shows a side view of the mattress and frame in folded position, also showing same in extended position in dotted lines.

Figures 7 and 8 show, respectively, plan and longitudinal vertical sectional views of the extension supporting frame for the mattress, showing the same in extended position, in dotted lines, and also showing the means for extending and withdrawing said frame.

Figure 9 shows a rear end view of said frame, and

Figure 10 shows a cross sectional view thereof.

Figures 2, 3:
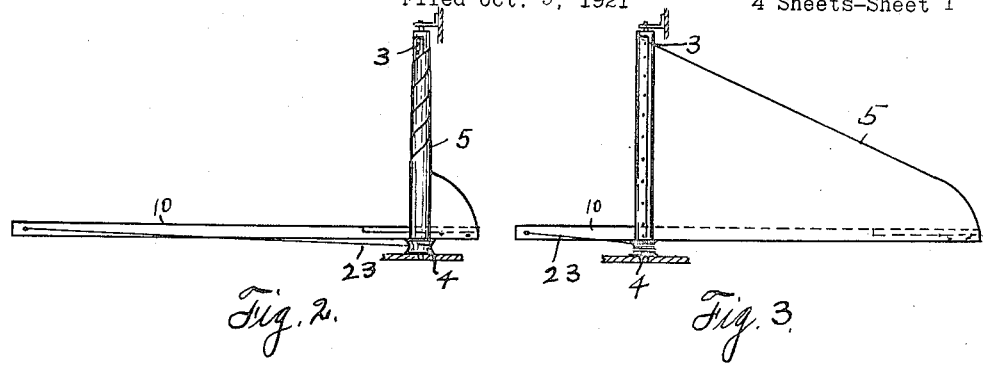
Figures 2 and 3 show one of the side curtains, in wound and unwound position, respectively.

Referring more particularly to the drawings, the numeral 1 designates the body of a motor vehicle, whose rear end is formed with a panel 2, preferably formed of sheet metal and hinged at the top so as to open and close. The lower edge of this panel is curved, as shown to give a finished contour and appearance to the body. On each side of this panel, and enclosed within the body there are the vertical rollers 3, 3 whose ends are mounted in suitable bearings. The lower end of each roller has a pulley 4 fastened thereon. The side curtains 5, 5 are fastened, at their forward ends to these respective rollers and are wound therearound when not in use, as shown in Figures 4 and 7.

The vehicle frame has the usual side members 6, 6 which support the cross bars 7, 7 and these cross bars are provided with the spaced bearing notches 8, 8 in which the side members of the extension frame 10 slides. The rear cross bar 7 has a pulley 11 centrally located thereon around which the cable 12 is wound. The respective ends of this cable pass around the sheaves 13, 13 carried by the respective ends of said cross bar and pass on forwardly and are attached to the front end of the extension frame as shown in Figures 7 and 8. Centrally located on the front cross bar 7 is a pulley 14 around which the cable 15 is wound. The ends of this cable pass around the sheaves 16, 16 carried by the ends of the front cross bar 7, and are attached to the rear end of the extension frame on each side.

The upper ends of the pulleys 11 and 14 are formed with ratchet teeth 17 and 18 with which the pivoted pawls 19 and 20 may be engaged to prevent them from turning backwardly and permitting slack in said cables. The pulleys may be turned by the crank 21 and the extension frame thereby be projected or withdrawn. When either pulley is turned to wind up its cable the pawl of the other one must be released to permit the latter to unwind. All of this mechanism for projecting and withdrawing this extension frame, excepting the crank, is hidden beneath the floor of the body. The crank is inserted for operating the pulleys through suitable openings left in the floor.

The pawls may be manipulated by means of pins, as 22 which project up through suitable slots in the floor.

As the extension frame moves outwardly the side curtains will unwind from the rollers 3 by reason of the fact that their rear or outer ends are attached to the rear ends of the respective side members of said extension frame.

At the same time the cables 23 will wind upon the pulley 4. These cables have their forward ends attached to the side members of the extension frame and as said frame is withdrawn said cables will rotate the rollers 3 to wind up said side curtains.

Figure 1:
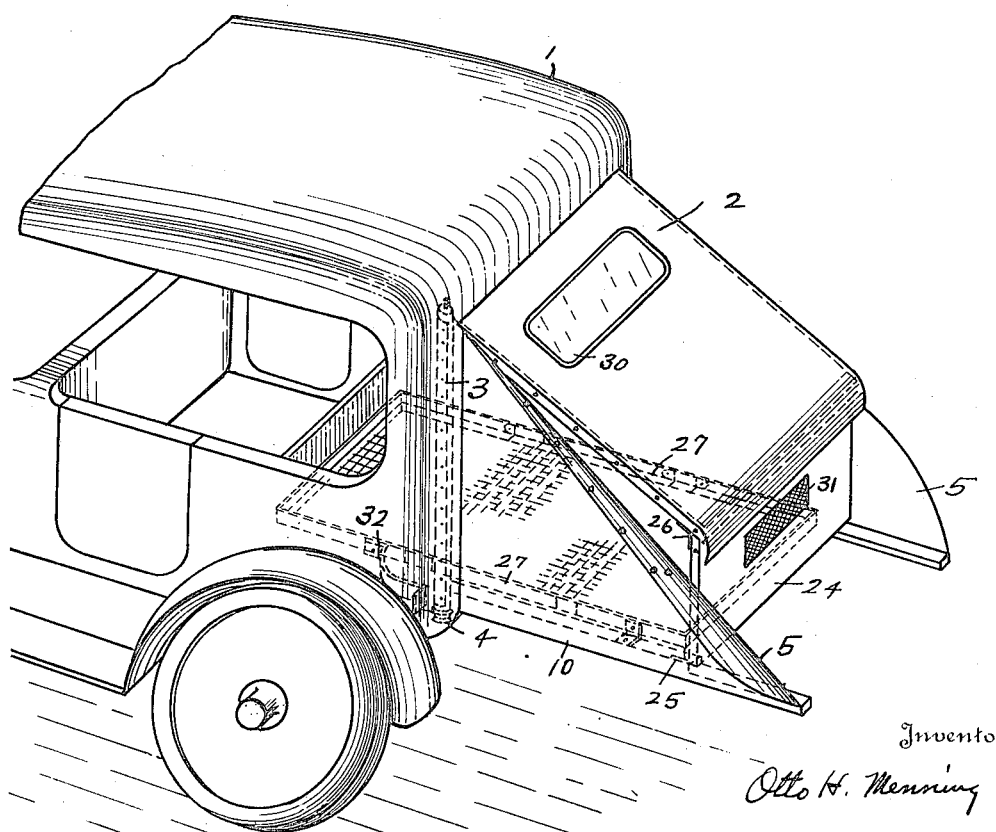
Figure 1 shows a perspective view of the rear end of a vehicle with the extension bed shown in position for use.

The numeral 24 designates a rear panel which lies in cutaway portions of the rear ends of the side members of the extension frame, when in collapsed position, as shown in Figures 4, 7 and 8. Its front edge is hinged to said side members by means of the hinges 25, 25 and its rear edge is hinged, the lower edge of the frame of the panel 2 by means of the hinges 26, 26 as shown in Figure 1.

The extension frame 10, when extended, supports the mattress frame 27, which is formed with hinged side members so that it, and the mattress and other bed clothing carried by it may be readily folded up underneath the rear seat 28 of the vehicle and thus be concealed from view and out of the way.

The lazy back 29 of the rear seat is secured to the panel 2 and this panel has the usual window 30. The rear panel 24 is provided with a suitable ventilator 31, as shown in Figure 1. The mattress frame 27 is anchored in place by means of the side brackets 32, 32 which are secured to the front section thereof, and to the framework of the body, one on each side.

When it is desired to extend the bed for use the pulley 11 is turned to wind up the cable 12. This will project the extension frame rearwardly and the back panel 2 and rear panel 24 will, in an obvious manner, assume the positions shown in Figure 1. The side curtains will also be unwound and their upper edge may then be fastened along the edges of the back panel, by means of buttons or other conventional fasteners. The rear seat 28 may then be removed and the mattress frame and mattress unrolled onto the extension frame and the device is then ready for use.

In order to withdraw the attachment within the body of the vehicle the mattress and frame are folded up and the side curtains unfastened from the back panel. The pulley 14 is then turned to wind up the cable 15 and this will operate to pull the extension frame into position beneath the vehicle. At the same time the rear panel 24 will assume a horizontal position, as shown in Figure 1, and the back panel 2 will fall into vertical position. The rollers 3 will also roll up the side curtains and all of these parts will then be concealed from view and the body will present the ordinary appearance and be in position for ordinary use.

What I claim is:—

1. The combination with a vehicle body, of an extension frame carried thereby, a seat above the frame, a foldable mattress support folded under said seat and adapted to be unfolded onto said frame when the frame is in extended position, and means for projecting said frame into extended position relative to the body.

2. The combination with a vehicle body, of a slidably mounted extension frame carried by the body and capable of being projected into extended position relative to, or withdrawn underneath said body, a passenger seat in the body, a foldable mattress support folded underneath the seat and adapted to be unfolded onto said support when the latter is in extended position.

3. The combination with a vehicle body, of an extendible frame carried thereby, means for extending the frame from said body to form a support, a back panel hinged to said body and forming a covering for said support, and a rear panel hinged to said back panel and also to said frame.

4. The combination with a vehicle body, of an extensible frame carried thereby, means for extending the frame from said body to form a support, a back panel hinged to said body and forming a covering for said support, and a rear panel hinged to said back panel and also to said frame, and side curtains forming with said panels an enclosure around said support.

5. The combination with a vehicle body having a back panel hinged thereto at its upper edge, of an extensible frame carried by said body, a rear panel hinged at one edge to said frame and at its other edge hinged to the back panel.

6. The combination with a vehicle body having a back panel hinged thereto at its upper edge, of an extensible frame carried by said body, a rear panel hinged at one edge to said frame and at its other edge hinged to the back panel, and side curtains forming with said panels an enclosure around said frame.

7. The combination with a vehicle body having a back panel hinged thereto at its upper edge, of an extensible frame carried by said body, a rear panel hinged at one edge to said frame and at its other edge hinged to the pack panel, side curtains forming with said panels an enclosure around said frame, and rollers within the body adapted to roll up said curtains.

In testimony whereof I have signed my name to this specification in the presence of two subscribing witnesses.

OTTO H. MENNING.

Witnesses:
E. V. HARDWAY,
JAS. W. OLIVER.